(12) United States Patent
Lengeling et al.

(10) Patent No.: US 9,547,428 B2
(45) Date of Patent: Jan. 17, 2017

(54) SYSTEM AND METHOD FOR TOUCHSCREEN KNOB CONTROL

(75) Inventors: Gerhard Lengeling, Los Altos Hills, CA (US); Marko Junghanns, Barmstedt (DE)

(73) Assignee: Apple Inc., Cupertino ( * ) Notice: Subject to any disclaimer, the term of this patent is extended or adjusted under 35 U.S.C. 154(b) by 728 days.

(21) Appl. No.: 13/038,276

(22) Filed: Mar. 1, 2011

(65) Prior Publication Data
US 2012/0226977 A1 Sep. 6, 2012

(51) Int. Cl.
*G06F 3/048* (2013.01)
*G06F 3/0484* (2013.01)
*G06F 3/0488* (2013.01)

(52) U.S. Cl.
CPC ....... *G06F 3/04847* (2013.01); *G06F 3/04883* (2013.01)

(58) Field of Classification Search
CPC ................................ G06F 3/033; G06F 3/048
USPC ........................................................ 715/702
See application file for complete search history.

(56) References Cited

U.S. PATENT DOCUMENTS

| | | | |
|---|---|---|---|
| 5,448,686 A | 9/1995 | Borrel et al. | |
| 5,483,261 A | 1/1996 | Yasutake | |
| 6,073,036 A | 6/2000 | Heikkinen et al. | |
| 6,211,856 B1 | 4/2001 | Choi et al. | |
| 6,278,443 B1 | 8/2001 | Amro et al. | |
| 6,313,838 B1 | 11/2001 | Deering | |
| 6,323,846 B1 | 11/2001 | Westerman et al. | |
| 6,396,507 B1 | 5/2002 | Kaizuka et al. | |
| 6,888,536 B2 | 5/2005 | Westerman et al. | |
| 6,950,539 B2 | 9/2005 | Bjorn et al. | |

(Continued)

FOREIGN PATENT DOCUMENTS

| | | | |
|---|---|---|---|
| EP | 0549944 A2 | 7/1993 | |
| EP | 0622722 A2 | 11/1994 | |

(Continued)

OTHER PUBLICATIONS

International Search Report and Written Opinion Mailed Jun. 11, 2012, PCT International Application No. PCT/US2012/025519 (8 pages), Jun. 11, 2012.

(Continued)

*Primary Examiner* — William Bashore
*Assistant Examiner* — Jeanette J Parker
(74) *Attorney, Agent, or Firm* — Morrison & Foerster LLP

(57) ABSTRACT

Disclosed herein are systems, methods, and non-transitory computer-readable storage media for controlling a user interface. A system configured to practice the method displays a user interface element, such as a knob, on a touch-sensitive display. The system receives input from a user associated with the user interface element via the touch-sensitive display. For example, the user can provide input to the knob via a tap, twist, flick, press-and-hold, drag, slide, or other touch-based input with a single or multiple fingers or other points of contact. The system matches the input to an input category selected from a group of predefined input categories for the user interface element, and updates the user interface element based on the input and based on the input category. The system can also update a value represented by the user interface element, such as a value that affects output or other settings of a software application.

26 Claims, 4 Drawing Sheets

(56) References Cited

U.S. PATENT DOCUMENTS

| | | | |
|---|---|---|---|
| 6,954,899 B1 | 10/2005 | Anderson | |
| 6,958,749 B1 | 10/2005 | Matsushita et al. | |
| 7,171,625 B1 | 1/2007 | Sacchi | |
| 7,339,580 B2 | 3/2008 | Westerman et al. | |
| 7,385,615 B2 | 6/2008 | Vale et al. | |
| 7,411,575 B2 | 8/2008 | Hill et al. | |
| 7,469,388 B1 | 12/2008 | Baudisch et al. | |
| 7,471,827 B2 | 12/2008 | Xie et al. | |
| 7,487,118 B2 | 2/2009 | Crutchfield, Jr. et al. | |
| 7,489,306 B2 | 2/2009 | Kolmykov-Zotov et al. | |
| 7,519,223 B2 | 4/2009 | Dehlin et al. | |
| 7,605,804 B2 | 10/2009 | Wilson | |
| 7,720,552 B1* | 5/2010 | Lloyd | 700/10 |
| 7,746,404 B2 | 6/2010 | Deng et al. | |
| 7,812,826 B2 | 10/2010 | Ording et al. | |
| 8,352,745 B2 | 1/2013 | Mckeeth | |
| 2002/0015024 A1 | 2/2002 | Westerman et al. | |
| 2002/0015064 A1 | 2/2002 | Robotham et al. | |
| 2002/0030699 A1 | 3/2002 | Van Ee | |
| 2002/0057385 A1 | 5/2002 | Sun et al. | |
| 2004/0183749 A1 | 9/2004 | Vertegaal | |
| 2004/0207653 A1 | 10/2004 | Stavely et al. | |
| 2004/0239649 A1* | 12/2004 | Ludtke | 345/173 |
| 2005/0020317 A1 | 1/2005 | Koyama | |
| 2005/0057524 A1 | 3/2005 | Hill et al. | |
| 2005/0084136 A1 | 4/2005 | Xie et al. | |
| 2005/0099494 A1 | 5/2005 | Deng et al. | |
| 2005/0104867 A1 | 5/2005 | Westerman et al. | |
| 2005/0134578 A1 | 6/2005 | Chambers et al. | |
| 2005/0174457 A1 | 8/2005 | Yoshino et al. | |
| 2005/0195157 A1 | 9/2005 | Kramer et al. | |
| 2006/0022955 A1 | 2/2006 | Kennedy | |
| 2006/0022956 A1* | 2/2006 | Lengeling et al. | 345/173 |
| 2006/0026521 A1 | 2/2006 | Hotelling et al. | |
| 2006/0026535 A1* | 2/2006 | Hotelling et al. | 715/863 |
| 2006/0026536 A1 | 2/2006 | Hotelling et al. | |
| 2006/0031786 A1 | 2/2006 | Hillis et al. | |
| 2006/0125937 A1 | 6/2006 | LeGall et al. | |
| 2006/0161846 A1 | 7/2006 | Van Leeuwen | |
| 2006/0161870 A1 | 7/2006 | Hotelling et al. | |
| 2006/0161871 A1 | 7/2006 | Hotelling et al. | |
| 2006/0164399 A1 | 7/2006 | Cheston et al. | |
| 2006/0181519 A1 | 8/2006 | Vernier et al. | |
| 2006/0242607 A1 | 10/2006 | Hudson | |
| 2006/0244735 A1 | 11/2006 | Wilson | |
| 2006/0274046 A1 | 12/2006 | Hillis et al. | |
| 2007/0061126 A1 | 3/2007 | Russo et al. | |
| 2007/0061862 A1 | 3/2007 | Berger et al. | |
| 2007/0146336 A1 | 6/2007 | Ording et al. | |
| 2007/0150826 A1 | 6/2007 | Anzures et al. | |
| 2007/0198942 A1 | 8/2007 | Morris | |
| 2008/0055273 A1 | 3/2008 | Forstall | |
| 2009/0073194 A1 | 3/2009 | Ording | |
| 2009/0089448 A1 | 4/2009 | Sze et al. | |
| 2011/0043527 A1 | 2/2011 | Ording et al. | |
| 2011/0072345 A1* | 3/2011 | Lim | 715/702 |
| 2011/0271183 A1* | 11/2011 | Bose et al. | 715/702 |
| 2011/0279384 A1* | 11/2011 | Miller et al. | 345/173 |
| 2012/0068925 A1* | 3/2012 | Wong et al. | 345/158 |
| 2012/0256863 A1* | 10/2012 | Zhang et al. | 345/173 |

FOREIGN PATENT DOCUMENTS

| | | |
|---|---|---|
| EP | 0965948 A2 | 12/1999 |
| EP | 1241558 A2 | 9/2002 |
| EP | 1942401 | 7/2008 |
| EP | 1 956 446 A2 | 8/2008 |
| EP | 1956433 | 8/2008 |
| JP | 1-177120 A | 7/1989 |
| JP | 10-134079 A | 5/1998 |
| JP | 2000-163193 A | 6/2000 |
| JP | 2001-290585 A | 10/2001 |
| JP | 2005-26836 A | 1/2005 |
| JP | 2005-82086 A | 3/2005 |
| JP | 2005-223765 A | 8/2005 |
| WO | 02/19081 A2 | 3/2002 |
| WO | 2006/020304 A2 | 2/2006 |
| WO | 2006/020305 A2 | 2/2006 |

OTHER PUBLICATIONS

International Preliminary Report on Patentability dated Sep. 12, 2013, received in International Patent Application No. PCT/US/2012/025519, which corresponds to U.S. Appl. No. 13/038,276, 8 pages (Lengeling).

International Search Report and Written Opinion received for PCT Patent Application No. PCT/US2006/062759, mailed on Aug. 1, 2007, 10 pages.

International Preliminary Report on Patentability received for PCT Patent Application No. PCT/US2006/062759, issued on Jul. 1, 2008, 8 pages.

Office Action received for Australian patent application No. 2006101096, mailed on Mar. 22, 2010, 1 page.

Office Action received for Chinese Patent Application No. 200680053036.X, mailed on Mar. 10, 2010, 12 pages (English Translation only).

Office Action received for Chinese Patent Application No. 201110103586.0, mailed on Apr. 23, 2014, 18 pages (10 pages of English Translation and 8 pages of Official copy).

Office Action received for European Patent Application No. 06846877.6, mailed on Oct. 13, 2008, 3 pages.

Office Action received for Japanese Patent Application No. 2011-198850, mailed on Mar. 10, 2014, 9 pages (5 pages of English Translation and 4 pages of Official copy).

Non-Final Office Action received for U.S. Appl. No. 11/618,633, mailed on Jan. 20, 2010, 19 pages.

Notice of Allowance received for U.S. Appl. No. 11/618,633, mailed on Aug. 9, 2010, 8 pages.

Final Office Action received for U.S. Appl. No. 12/901,431, mailed on Sep. 28, 2011, 10 pages.

Non-Final Office Action received for U.S. Appl. No. 12/901,431, mailed on May 5, 2011, 8 pages.

Alejandre, Suzanne, "Graphing Linear Equations", Available at <http://mathforum.org/alejandre/palm/times.palm.html>, retrieved on Jun. 12, 2006, 3 pages.

Bitstream®, "ThunderHawk Pocket PC Edition for End Users", Available at <http://www.bitstream.com/wireless/products/pocketpc/faq_using.html>, retrieved on Jun. 12, 2006, 4 pages.

Chen et al., "A Novel Navigation and Transmission Technique for Mobile Handheld Devices", Technical Report CSE-2003-1, Department of Computer Science, University of California at Davis, 2003, 8 pages.

Fling, Brian, "Designing for Mobile, Bringing Design Down to Size", Blue Flavor, 2006, 103 pages.

Geary, Leigh, "Orange SPV C600 Review", Available online at <http://www.coolsmartphone.com/2010/12/23/orange-spv-c600-review/>, Dec. 23, 2010, 58 pages.

Han, Jeff Y., "Multi-Touch Interaction Research", Available at <http://cs.nyu.edu/~jhan/ftirtouch/>, 2006, 4 pages.

Jazzmutant, "Human Machine Interfaces for Real-time Applications", Available at <http://www.jazzmutant.com/dexter_introduction.php>, Aug. 14, 2007, 20 pages.

Jazzmutant, "Jazzmutant Lemur", Available at <http://64.233.167.104/search?a=cache:3g4wFSaZiXIJ:www.nuloop.c>, retrieved on Nov. 16, 2005, 3 pages.

Jazzmutant, "The Lemur: Multitouch Control Surface", Available at <http://64233.167.104/search?q=cache:j0_nFbNVzOcJ:www.cycling7>, retrieved on Nov. 16, 2005, 3 Pages.

Karlson et al., "AppLens and LaunchTile: Two Designs for One-Handed Thumb Use on Small Devices", CHI 2005, Papers: Small Devices 1, Apr. 2-7, 2005, pp. 201-210.

Opera Software, "Download the Opera Mobile™ Browser", Available at <http://www.opera.com/products/mobile/products/>, retrieved on Oct. 19, 2006, 5 pages.

Opera Software, "Opera 7.60 for Series 60 Mobile", Available at <http://jp.opera.com/support/tutorials/s60/760/O760manual.pdf>, 2009, 14 pages.

(56) References Cited

OTHER PUBLICATIONS

Opera Software, "Opera 8.5 Beta 2 for Windows Mobile, Pocket PC", Available at <http://www.opera.com/products/mobile/products/winmobileppc>, retrieved on Apr. 5, 2006, 2 pages.

Opera Software, "Opera 8.5 for S60 Phones—Get the Full Internet Experience on Your Mobile Phone", Available at <http://www.symbian-freak.com/news/1105/opera.htm>, retrieved on Apr. 5, 2006, 3 pages.

Opera Software, "Opera for Mobile, The Full Web Anytime, Anywhere", Available at <www.opera.com/mobile>, Jan. 2006, 7 pages.

Opera Software, "Opera for S60 Tutorial", Available at <http://www.xmarks.com/site/www.opera.com/support/tutorials/s60/>, retrieved on Apr. 5, 2006, 5 pages.

Opera Software, "Opera for Windows Mobile Smartphone 2003 Tutorial", Available at <http://www.opera.com/support/tutorials/winmobile>, retrieved on Apr. 5, 2005, 4 pages.

Opera Software, "The New Opera Browser for Series 60 Features Zoom and Password Manager", Press Releases Database, Available at <http://pressreleases.techwhack.com/1334/1411-opera-browser-features-zoom-and-password>, Nov. 14, 2005, 3 pages.

Roto et al., "Minimap—A Web Page Visualization Method for Mobile Phones", Proceedings of the SIGCHI Conference on Human Factors in Computing Systems, Apr. 22-27, 2006, pp. 35-44.

Salmre, I., "Chapter 2, Characteristics of Mobile Applications", Salmre_02.fm, Dec. 20, 2004, pp. 19-36.

Tidwell, Jenifer, "Animated Transition", Designing Interfaces, Patterns for effective Interaction Design, First Edition, O'Reilly Media, Inc., Nov. 2005, 4 pages.

Wobbrock et al., "WebThumb: Interaction Techniques for Small-Screen Browsers", UIST'02, Paris France, Oct. 27-30, 2002, pp. 205-208.

Xiao et al., "Slicing*—Tree Based Web Page Transformation for Small Displays", International Conference on Information and Knowledge Management, Oct. 31-Nov. 5, 2005, 2 pages.

Office Action received for Chinese Patent Application No. 201110103586.0, mailed on Oct. 29, 2014, 10 pages (3 pages of English Translation and 7 pages of Official Copy).

Office Action received for Japanese Patent Application No. 2011-198850, mailed on Mar. 2, 2015, 4 pages (Official Copy only).(See Communication under 37 CFR § 1.98(a) (3)).

Notice of Allowance received for U.S. Appl. No. 12/901,431, mailed on Jun. 23, 2016, 8 pages.

Office Action received for Chinese Patent Application No. 201110103586.0, mailed on Aug. 3, 2016, 7 pages (2 pages of English Translation and 5 pages of Official Copy).

Non Final Office Action received for U.S. Appl. No. 12/901,431, mailed on Dec. 30, 2015, 10 pages.

* cited by examiner

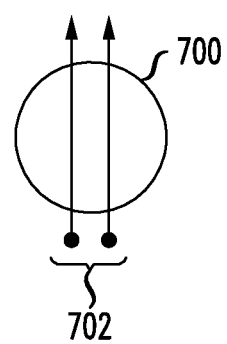
FIG. 7
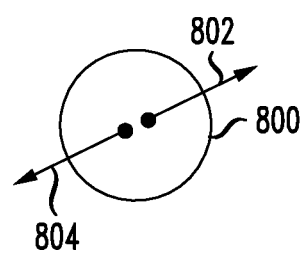
FIG. 8
FIG. 9
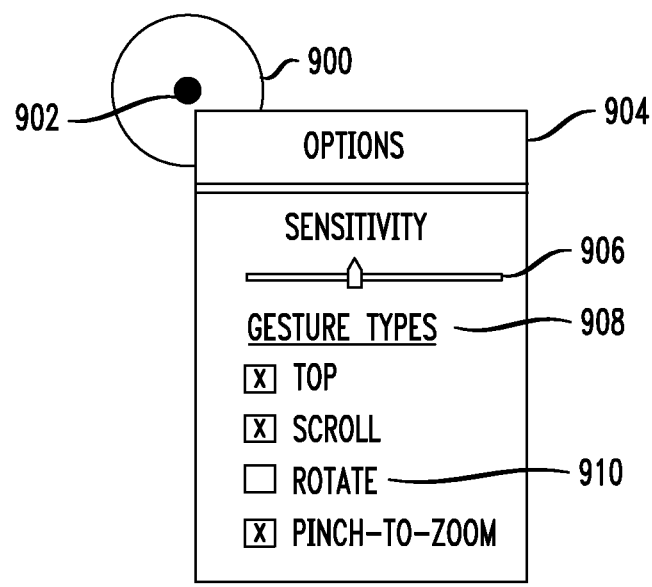

SYSTEM AND METHOD FOR TOUCHSCREEN KNOB CONTROL

BACKGROUND

1. Technical Field

The present disclosure relates to user interfaces and more specifically to making touch-based interfaces more user friendly.

2. Introduction

With the advent of capacitive touch screens and other touch-sensitive technology on devices such as smartphones, tablet computers, and desktop computers, software and hardware developers have focused on adapting user interfaces to take more effective advantage of unique features of this technology. While some user interface elements, such as a button, map very easily to a touch-based interface, other user interface elements, such as a scroll bar on an edge of a scrollable region, can be replaced completely. However, certain user interface elements, such as a knob, are not typical to traditional graphical user interfaces and can present problems in training new users. New or inexperienced users may be unsure how exactly to interact with this type of user interface elements, causing apprehension, fear, and/or uncertainty for a certain segment of the user population. This, in turn, can reduce the approachability of a particular hardware platform as well as individual software applications running on the hardware platform.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for controlling a user interface in a flexible, intuitive way that is approachable and readily usable without detailed explanation or documentation. A system configured to practice the method first displays a user interface element, such as a virtual on-screen knob, on a touch-sensitive display and receives, from a user, input associated with the user interface element via the touch-sensitive display. The input can be a touch, a tap, a swipe, a multi-finger gesture, a flick, a drag, and/or a press-and-hold, for example. The system matches the input to an input category selected from a group of predefined input categories for the user interface element. The input can also be multi-modal, such as a combination of a touch gesture and a speech command. In this scenario, the system can match only a portion, such as the touch gesture, of the multi-modal input to the input category. Then the system updates the user interface element based on the input and based on the input category. The system can optionally translate the input to a standardized input based on the input category and update the user interface element based on the standardized input.

This approach is flexible and can accept multiple different types of input. For example, the user can provide a first user input of a first input category, such as a circular or rotational gesture about the knob, and a second user input of a second input category, such as a tap in a particular position relative to the knob. These two different types of input can cause the knob to adjust to the same position or value.

The system can match input to an input category based on a similarity threshold to one of the group of predefined input categories. If the input does not match any input category based on the similarity threshold, the system can prompt the user for additional input defining a new predefined input category, receive the additional input from the user, and create the new predefined input category based on the additional input.

The user and/or an automated process can toggle availability of a certain input category in the group of predefined input categories. Further, each individual input category can include its own sensitivity and/or scale which can be user customizable. For example, a horizontal tap and drag gesture 3 centimeters in length may be equivalent to a vertical tap and drag gesture 5 centimeters in length.

The system can alter not only the user interface element, but also one or more variable represented by the user interface element and/or other aspects of a running software application based on the input and the input category. The system can update the user interface element in substantially real time as the input is received. Real time or substantially real time updating can serve as feedback to the user to demonstrate the effect of the particular gesture.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates a multi-finger directional gesture in relation to a virtual knob;

FIG. 8 illustrates pinch and zoom gestures in relation to a virtual knob;

FIG. 9 illustrates a menu gesture in relation to a virtual knob;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved user interfaces in touch-screen enabled devices such that the user interfaces are more intuitive and easily approachable. A system, method and non-transitory computer-readable media are disclosed which facilitate multiple input categories for a single user interface element, such as a knob. A brief introductory description of a basic general purpose system or computing device in FIG. 1 which can be employed to practice the concepts is disclosed herein. A more detailed description of the various input categories, user interface approaches, and exemplary methods will then follow. These variations shall be discussed herein as the various embodiments are set forth. The disclosure now turns to FIG. 1.

Figure 1:
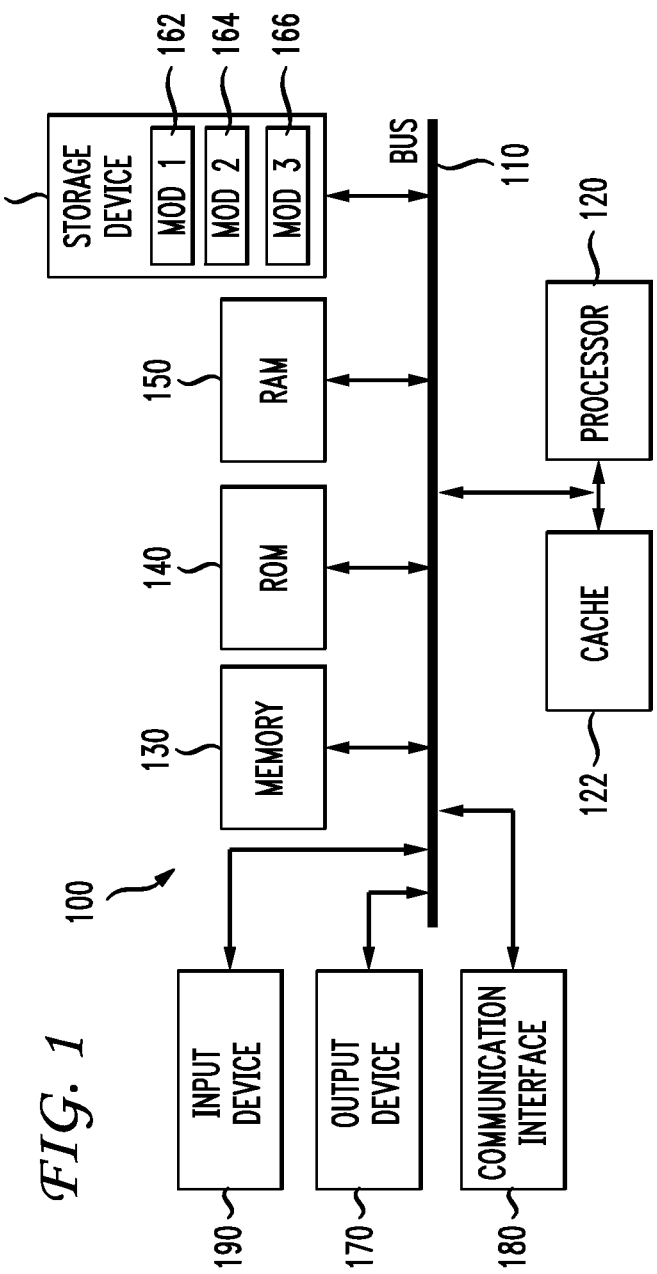
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
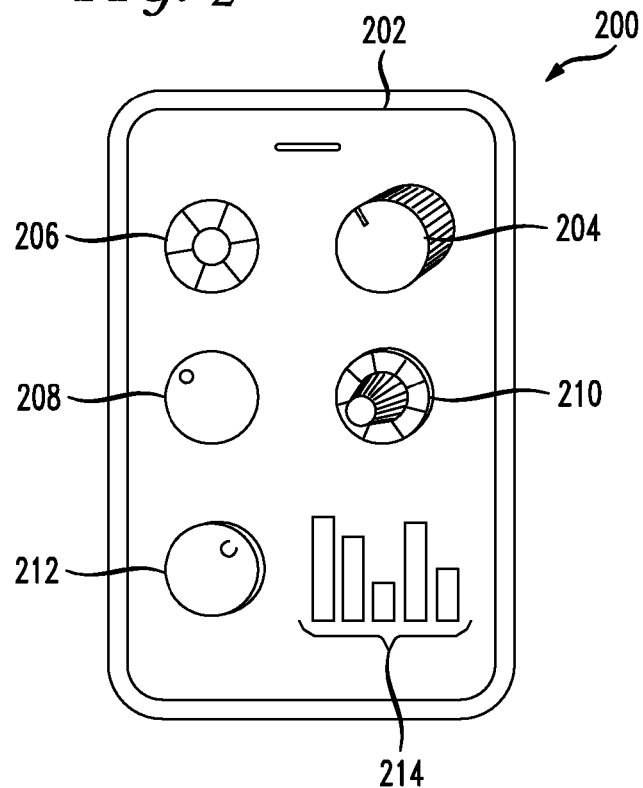
FIG. 2 illustrates an example mobile device with a touchscreen interface and exemplary virtual knobs on the touchscreen interface.

Having disclosed some basic computing device components and concepts, the disclosure returns to a discussion of controlling a user interface in a flexible, intuitive way that is approachable and readily usable without detailed explanation or documentation. FIG. 2 illustrates an example mobile device 200, such as a smartphone, tablet, or computer, with a touch-screen interface 202 and exemplary virtual knobs 204, 206, 208, 210, 212 on the touch-screen interface 202. The knobs can be images, three-dimensional representations or approximations of real knobs, simple geometric shapes, and/or any other graphical representation. While the disclosure here is primarily discussed in terms of virtual knobs on a touch-screen interface, the same principles apply equally to other user interface elements that a user may wish to interact with using different categories, types, or classes of user input. The user interface 202 can also include a status indicator 214 for some or all of the values represented by the knobs.

When a user is presented with these knobs, the user may not know how to manipulate the knobs without some kind of tutorial. One goal of this disclosure is to allow users to manipulate the knobs (or other user applicable interface elements) in any of a set of predefined ways. The user does not need to read a manual or learn any new behaviors to interact with the application via the knobs. In this way, the user can simply choose whatever input approach makes sense and use that approach. If one user wants to tap, hold, and dial around the knob, the system can understand and appropriately process that input with a suitable hardware and/or software mechanism. If another user wants to tap at particular points around the knob, the system can understand and appropriately process that input using a different hardware and/or software mechanism. If yet another user wants to tap and drag across an imaginary horizontal area, the system can understand and appropriately process that input using yet a different hardware and/or software mechanism. Some exemplary categories of touch-screen input for manipulating a knob are discussed in FIGS. 3-9 below.

Figure 3:
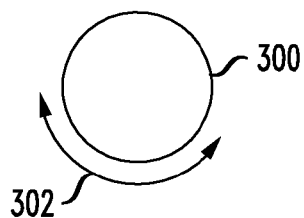
FIG. 3 illustrates a rotational gesture in relation to a virtual knob.

FIG. 3 illustrates a rotational gesture 302 in relation to a virtual knob 300. In this input category, the user taps and drags around the edge of the virtual knob in a circular motion. As the user sweeps around the perimeter of the virtual knob, the system updates the knob and the value the knob represents. This input category can apply to virtually any user interface object, even ones that are not round. The user can tap and drag within the space of the virtual knob, on the edge or perimeter of the virtual knob, or outside the virtual knob. In one aspect, if the user input is a tap and drag on a region of the screen outside of the virtual knob, the system can determine to which knob to direct the input based on the user's tap and drag motion. For instance, the system can calculate the intended target of a tap and drag motion by treating the dragging motion as an arc of a circle or ellipse and determining/estimating the center of the circle or ellipse. Then the system can compare the determined/estimated center with user interface elements on the display and identify a best match.

Figure 4:
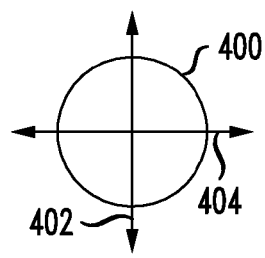
FIG. 4 illustrates horizontal and vertical gestures in relation to a virtual knob.

FIG. 4 illustrates horizontal 404 and vertical gestures 402 in relation to a virtual knob 400. In this input category, the user taps on the touch screen and drags in a straight line. The system treats this input as if the user were dragging a slider bar across an imaginary slider. As the dragging motion goes further in one direction or another, the value for the knob increases or decreases. In one embodiment, the user can tap and drag in any direction, not simply across the horizontal or vertical axes.

Figure 5:
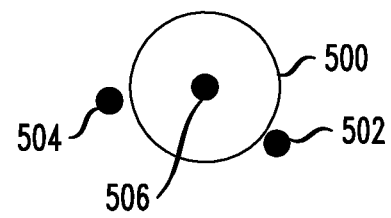
FIG. 5 illustrates point gestures in relation to a virtual knob.

FIG. 5 illustrates point gestures 502, 504, 506 in relation to a virtual knob 500. In this input category, the user taps at various points on the border or edge of the virtual knob. The system can translate the taps at the border of the virtual knob into direct input. For instance, if the knob represents a value from 1 to 12, and the user taps at position 502, then the system can adjust the knob and the value the knob represents to a value of 4. If the user taps at position 504, then the system can adjust the knob and the value of the knob represents to a value of 9. In some instances, the system can provide different functionality to specialized taps, such as a tap in the center or approximately in the center of the knob, such as tap 506. If the knob is currently assigned a particular value, such as 7, and the user taps in the center, the system can set the knob value to 0. If the user taps in the center again, then the system can restore the previous value of 7. A double tap anywhere on the knob can accomplish a similar functionality as the single tap in the center, for example.

Figure 6:
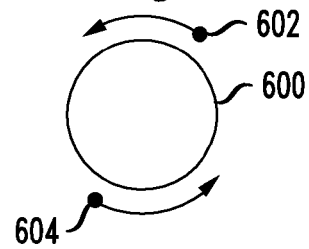
FIG. 6 illustrates a multi-finger rotational gesture in relation to a virtual knob.

FIG. 6 illustrates a multi-finger rotational gesture 602, 604 in relation to a virtual knob 600. In this input category, the user simultaneously taps two fingers 602, 604 (or other points of contact) on the touch screen and drags each about the virtual knob in a circular or rotational manner. This motion roughly approximates the motion necessary to manipulate an actual knob and not a virtual knob on a touch-screen. The same general principles apply in this input category as in FIG. 3, but the system can receive or infer additional information from the multiple points of contact, how fast each moves relative to the other, and so forth.

FIG. 7 illustrates a multi-finger directional gesture 702 in relation to a virtual knob 700. In this input category, the user taps and drags with two or more fingers. The system can treat this gesture in a same, similar, or different manner than the input category illustrated in FIG. 4. For example, the system can treat a single finger directional gesture as a more sensitive motion, while the multi-finger directional gesture is a less sensitive, gross motion. For example, if the knob represents values from 1 to 1000, a single finger directional gesture can increment the knob value by one for each unit of distance. A two finger directional gesture can increment the knob value by ten for the same unit of distance, and a three finger directional gesture can increment the knob value by hundred for the same unit of distance. Thus, the same overall gesture category can include sub-categories of similar type, differing in the scale or sensitivity and the number of points of contact on the touch-screen.

FIG. 8 illustrates a pinch and zoom gesture 802, 804 in relation to a virtual knob 800. In this input category, the user taps two or more fingers and drags at least one away from the other and can drag each away from the other. The scale of the adjustment to the value of the knob is based on the increasing or decreasing distance between the points of finger contact.

The same user interface element can be configured to accept other types of input. For example, FIG. 9 illustrates a menu gesture 902 in relation to a virtual knob 900. In this input category, the user taps and holds in a center region of the knob (or elsewhere) without dragging. After a delay, the system opens a menu 904 with various options, such as sensitivity 906, a list of gesture types 908, etc. The user can enable or disable certain gesture types with respect to the entire interface or with respect to a particular user interface element. For instance, the user can disable a rotate gesture 910 by unchecking the checkbox.

The categories of input disclosed herein are exemplary. The approaches set forth herein can include additional categories of input. The exact positioning of the taps, drags, and other touch gestures are exemplary of multiple different categories and should not be construed as limiting the principles disclosed herein. New input categories and variations of the disclosed input categories can be incorporated using the principles of this disclosure.

Figure 10:
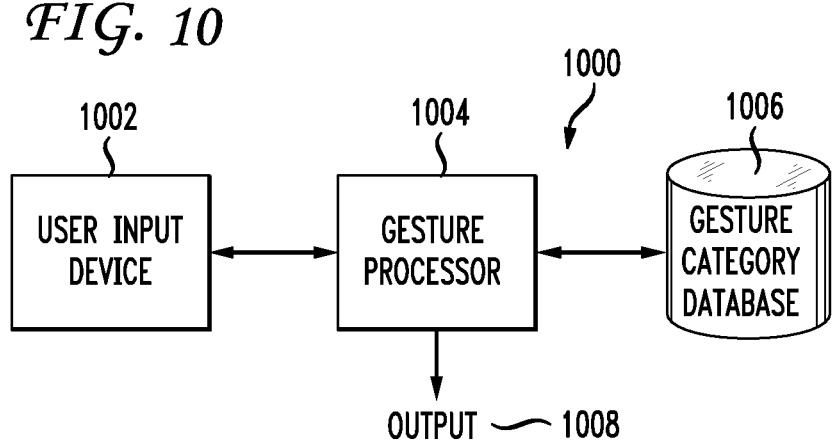
FIG. 10 illustrates an exemplary block diagram for processing input associated with a virtual knob.

FIG. 10 illustrates an exemplary block diagram 1000 for processing input associated with a virtual knob. A user input device 1002 receives the user input such as touch-screen input. The gesture processor 1004 receives the user input from the user input device 1002. Based on a current screen state representing which user interface elements are currently displayed on the touch-screen, the gesture processor analyzes the user input and compares the user input with entries in a gesture category database 1006. After finding a sufficient match in the gesture category database 1006, the gesture processor 1004 provides some kind of output 1008. The output 1008 can be a value. Alternatively, the output 1008 can be an action taken by the gesture processor 1004 to manipulate a value represented by a user interface element directly or indirectly.

This approach is flexible and provides for a single user interface element to accept multiple different types of input. For example, the user can provide a first user input of a first input category, such as a circular or rotational gesture about the knob, and a second user input of a second input category, such as a tap in a particular position relative to the knob. These two different types of input can cause the knob to adjust to the same position or value.

The system can match input to an input category based on a similarity threshold to one of the group of predefined input categories. If the input does not match any input category based on the similarity threshold, the system can prompt the user to for additional input defining a new predefined input category, receive the additional input from the user, and create the new predefined input category based on the additional input.

Figure 11:
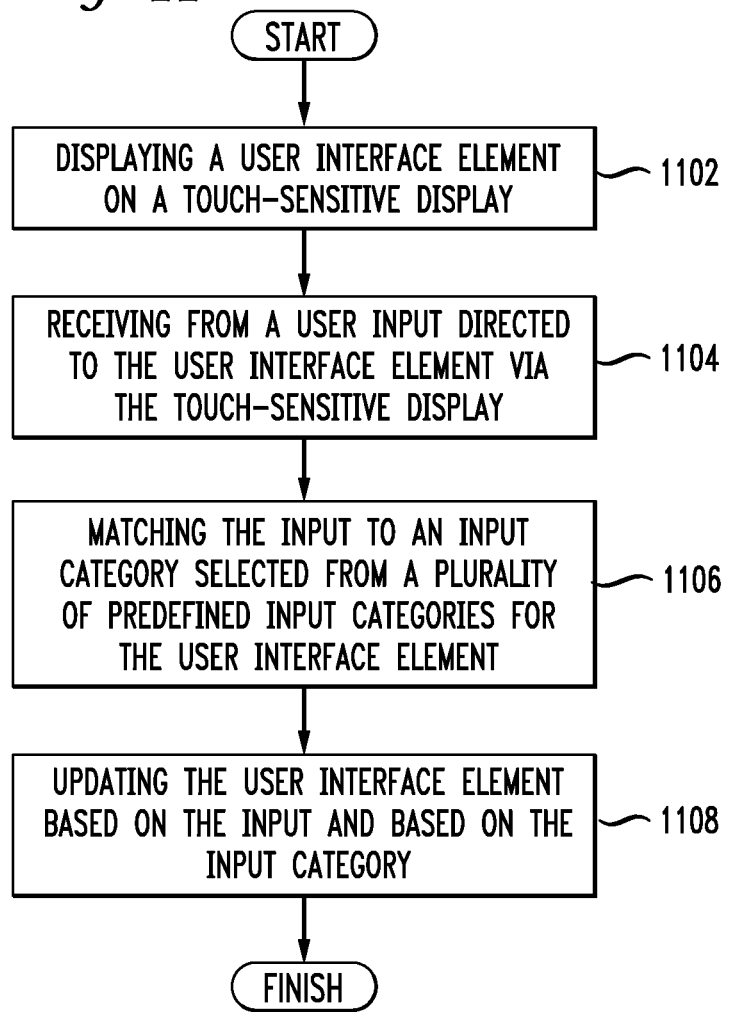
FIG. 11 illustrates an example method embodiment.

Having disclosed some various gesture categories, the disclosure now turns to the exemplary method embodiment shown in FIG. 11. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. FIG. 11 illustrates an example method embodiment. A system configured to practice the method first displays a user interface element, such as a virtual on-screen knob representing one or more values, on a touch-sensitive display (1102) and receives, from a user, input associated with the user interface element via the touch-sensitive display (1104). The user interface element can be capable of accepting any of a group of different categories of predefined user input. The input can be a touch, a tap, a swipe, a multi-finger gesture, a flick, a drag, and/or a press-and-hold, for example. The system matches the input to an input category selected from a group of predefined input categories for the user interface element (1106). The system can match the input to the input category based on a similarity threshold to one of the group of predefined input categories. The input can also be multi-modal, such as a combination of a touch gesture and a speech command. In this scenario, the system can match only a portion, such as the touch gesture, of the multi-modal input to the input category. Then the system updates the user interface element based on the input and based on the input category (1108). The system can optionally translate the input to a standardized input based on the input category and update the user interface element based on the standardized input.

If the input does not match any input category based on the similarity threshold, the system can prompt the user to for additional input defining a new predefined input category, receive the additional input from the user, and create the new predefined input category based on the additional input. In some variations, the system can modify existing input categories instead of creating new predefined categories.

The user and/or an automated process can toggle availability of a certain input category in the group of predefined input categories. Further, each individual input category can include its own sensitivity and/or scale which can be user customizable. For example, a horizontal tap and drag gesture 3 centimeters in length may be equivalent to a vertical tap and drag gesture 5 centimeters in length. A first user input can update the user interface based on a first input category in an equivalent manner to a second user input based on a second input category. The system can also alter one or more aspect of a running software application based on the input and the input category. The system can also update the user interface element in real time or substantially real time as the input is received, effectively animating the knob as the user is manipulating the knob via touch input based on the detected input category.

An exemplary system for controlling a software application according to the principles disclosed herein can include a processor and a touch-sensitive display. The exemplary system can further include a first module configured to control the processor to display a group of user-manipulable user interface elements on the touch-sensitive display, a second module configured to control the processor to receive a group of simultaneous user inputs associated with a subset of the group of user-manipulable user interface elements, a third module configured to control the processor to match each of the group of simultaneous user inputs to a respective input category selected from a group of predefined input categories for the subset of the group of user-manipulable user interface elements, and a fourth module configured to control the processor to control the software application based on each of the group of simultaneous user inputs and the respective input category. Such an exemplary system can be a mobile device. The software application can be a media creation and/or consumption application. The group of simultaneous user inputs can be of a same input category or of different input categories. The system can further include a fifth module configured to control the processor to update the group of user-manipulable user interface elements based on the group of simultaneous user inputs and the respective input category for each simultaneous user input.

The system can provide for a cancel gesture as an input category separate from other inputs so that a user can cancel a previously submitted input. Further, the system can provide for a cancel gesture added as a continuous part of a pending gesture so that the user can cancel the entire gesture. The user can also change gesture types in the middle of a gesture. For example, the user can start manipulating a knob with a circular motion dragging gesture in a first category, then change categories to a vertical dragging motion without lifting the dragging finger from the touch-screen. This can be advantageous if the circular motion has course-grain control over the knob value and then the user wishes to smoothly change to a more fine-grain control over the knob value afforded by the vertical dragging motion gesture category.

Using the principles disclosed herein, the user is free to use/manipulate the knob or other user interface elements on a touch-enabled device in whichever way is most natural for the user. The user does not need to read some complicated manual or learn any new behavior to effectively use the knob to control the application. The usability and approachability are much improved for software applications incorporating the principles disclosed herein.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be incorporated in audio creation/consumption programs, touch-enabled games, artistic/creative applications, and virtually any other touch-aware software application. Those skilled in the art will readily recognize various modifications and changes that may be made to the principles described herein without following the example embodiments and applications illustrated and described herein, and without departing from the spirit and scope of the disclosure.

We claim:

1. A method of controlling a user interface, the method comprising:
   at an electronic device with a touch-sensitive display, one or more processors, and memory:
      displaying an adjustable virtual knob on the touch-sensitive display, wherein the adjustable virtual knob has a plurality of distinct predefined input categories, the adjustable virtual knob represents a value, and each of the distinct predefined input categories comprise at least one of a drag gesture, a tap gesture, a multi-finger directional gesture, or a pinch gesture;
      receiving, from a user, input on the adjustable virtual knob via the touch-sensitive display;
      in response to receiving the input on the adjustable virtual knob:
         comparing the input on the adjustable virtual knob to input category definition information for the plurality of distinct predefined input categories for the adjustable virtual knob;
         matching the input to a respective input category selected from the plurality of distinct predefined input categories for the adjustable virtual knob based on the comparison;
         interpreting the input in accordance with the respective input category for the adjustable virtual knob; and
         updating the value represented by the adjustable virtual knob based on the input as interpreted in accordance with the respective input category for the adjustable virtual knob, wherein updating the value represented by the adjustable virtual knob includes:
            when the input matches a first input category, the value represented by the adjustable virtual knob is updated from a first value to a second value based on a characteristic of the input and the first input category; and
            when the input matches a second input category, the value represented by the adjustable virtual knob is updated from the first value to the second value based on a characteristic of the input and the second input category.

2. The method of claim 1, wherein the input further includes a menu gesture, wherein the menu gesture is activated in response to a tap and hold finger contact in a center region of the knob without dragging by the user.

3. The method of claim 2, wherein the menu gesture is determined by a duration of the finger contact of the input.

4. The method of claim 1, wherein matching the input to the respective input category is based on a similarity threshold to one of the plurality of distinct predefined input categories.

5. The method of claim 4, further comprising, if the input does not match any of the plurality of distinct input categories based on the similarity threshold:
prompting the user to for additional input defining a new predefined input category;
receiving the additional input from the user; and
creating the new predefined input category based on the additional input.

6. The method of claim 1, further comprising:
translating the input to a standardized input based on the respective input category; and
updating the adjustable virtual knob based on the standardized input.

7. The method of claim 1, wherein the user can toggle availability of a certain input category in the plurality of distinct predefined input categories.

8. The method of claim 1, wherein a sensitivity for at least one input category in the plurality of distinct input categories is user customizable.

9. The method of claim 1, wherein the input is multi-modal input, and wherein a portion of the multi-modal input is matched to the input category.

10. The method of claim 1, further comprising altering at least one aspect of a running software application based on the input and the input category.

11. The method of claim 1, wherein the adjustable virtual knob is updated in substantially real time as the input is received.

12. The method of claim 1, further comprising:
determining an increase or decrease in the value represented by the adjustable virtual knob based on a direction of movement of a finger contact of the input.

13. The method of claim 1, wherein granularity of adjustment of the virtual knob is based on a number of finger contacts of the input.

14. The method of claim 1, wherein the input comprises two or more gesture types, and the input is matched to the first input category while the input corresponds to a first gesture type, and the input is matched to the second input category while the input corresponds to a second gesture type.

15. A non-transitory computer-readable storage medium storing one or more programs comprising instructions which, when executed by a computing device with a touch-sensitive display, cause the computing device to:
display an adjustable virtual knob on the touch-sensitive display, wherein the adjustable virtual knob has a plurality of distinct predefined input categories, the adjustable virtual knob represents a value, and each of the distinct predefined input categories comprise at least one of a drag gesture, a tap gesture, a multi-finger directional gesture, or a pinch gesture;
receive from a user input on the adjustable virtual knob via the touch-sensitive display;
in response to receiving the input on the adjustable virtual knob:
compare the input on the adjustable virtual knob to input category definition information for the plurality of distinct predefined input categories for the adjustable virtual knob;
match the input to a respective input category selected from the plurality of distinct predefined input categories for the adjustable virtual knob based on the comparison; and
update the value represented by the adjustable virtual knob based on the input as interpreted in accordance with the respective input category for the adjustable virtual knob, wherein updating the value represented by the adjustable virtual knob includes:
when the input matches a first input category, the value represented by the adjustable virtual knob is updated from a first value to a second value based on a characteristic of the input and the first input category; and
when the input matches a second input category, the value represented by the adjustable virtual knob is updated from the first value to the second value based on a characteristic of the input and the second input category.

16. The non-transitory computer-readable storage medium of claim 15, wherein matching the input to the respective input category is based on a similarity threshold to one of the plurality of distinct predefined input categories.

17. The non-transitory computer-readable storage medium of claim 16, wherein the one or more programs include instructions which, when executed by the device, cause the device to, if the input does not match any of the plurality of distinct input categories based on the similarity threshold:
prompt the user to for additional input defining a new predefined input category;
receive the additional input from the user; and
create the new predefined input category based on the additional input.

18. The non-transitory computer-readable storage medium of claim 15, wherein the one or more programs include instructions which, when executed by the device, cause the device to:
translate the input to a standardized input based on the respective input category; and
update the adjustable virtual knob based on the standardized input.

19. The non-transitory computer-readable storage medium of claim 15, wherein a sensitivity for at least one input category in the plurality of distinct input categories is user customizable.

20. The non-transitory computer-readable storage medium of claim 15, wherein the one or more programs include instructions which, when executed by the device, cause the device to update the adjustable virtual knob substantially in real time as the input is received.

21. A computing device, comprising:
a touch-sensitive display;
one or more processors;
memory; and
one or more programs, wherein the one or more programs are stored in the memory and configured to be executed by the one or more processors, the one or more programs including instructions for:
displaying an adjustable virtual knob on the touch-sensitive display,
wherein the adjustable virtual knob has a plurality of distinct predefined input categories,
the adjustable virtual knob represents a value, and each of the distinct predefined input categories comprise at least one of a drag gesture, a tap gesture, a multi-finger directional gesture, a pinch gesture, or a pinch gesture;

receiving, from a user, input on the adjustable virtual knob via the touch-sensitive display;

in response to receiving the input on the adjustable virtual knob:
  comparing the input on the adjustable virtual knob to input category definition information for the plurality of distinct predefined input categories for the adjustable virtual knob;
  matching the input to a respective input category selected from the plurality of distinct predefined input categories for the adjustable virtual knob based on the comparison;
  interpreting the input in accordance with the respective input category for the adjustable virtual knob; and
  updating the value represented by the adjustable virtual knob based on the input as interpreted in accordance with the respective input category for the adjustable virtual knob, wherein updating the value represented by the adjustable virtual knob includes:
    when the input matches a first input category, the value represented by the adjustable virtual knob is updated from a first value to a second value based on a characteristic of the input and the first input category; and
    when the input matches a second input category, the value represented by the adjustable virtual knob is updated from the first value to the second value based on a characteristic of the input and the second input category.

22. The device of claim 21, wherein matching the input to the respective input category is based on a similarity threshold to one of the plurality of distinct predefined input categories.

23. The device of claim 21, wherein the one or more programs include instructions for, if the input does not match any of the plurality of distinct input categories, based on the similarity threshold:
  prompting the user to for additional input defining a new predefined input category;
  receiving the additional input from the user; and
  creating the new predefined input category based on the additional input.

24. The device of claim 21, wherein the one or more programs include instructions for:
  translating the input to a standardized input based on the respective input category; and
  updating the adjustable virtual knob based on the standardized input.

25. The device of claim 21, wherein a sensitivity for at least one input category in the plurality of distinct input categories is user customizable.

26. The device of claim 21, wherein the one or more programs include instructions for updating the adjustable virtual knob substantially in real time as the input is received.

* * * * *

UNITED STATES PATENT AND TRADEMARK OFFICE
CERTIFICATE OF CORRECTION

PATENT NO. : 9,547,428 B2
APPLICATION NO. : 13/038276
DATED : January 17, 2017
INVENTOR(S) : Gerhard Lengeling et al.

It is certified that error appears in the above-identified patent and that said Letters Patent is hereby corrected as shown below:

On the Title Page

Item (73) at Column 1, Line number 1, please delete "Cupertino" and insert -- Cupertino (US) --.

In the Claims

At Column 13, Claim number 21, Line number 3, please delete "a pinch gesture,".

Signed and Sealed this
Ninth Day of May, 2017

Michelle K. Lee
*Director of the United States Patent and Trademark Office*